United States Patent
Aldous et al.

(10) Patent No.: US 11,999,909 B2
(45) Date of Patent: Jun. 4, 2024

(54) ASPHALT AIR BLOWING WITH LIQUID JET EJECTOR AND COIL

(71) Applicant: ExxonMobil Technology and Engineering Company, Annandale, NJ (US)

(72) Inventors: Keith K. Aldous, Montgomery, TX (US); Sara K. Green, Houston, TX (US); William R. Harrison, Bushkill, PA (US); Vincent Kroll, Katy, TX (US); Kevin Sutowski, Basking Ridge, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 54 days.

(21) Appl. No.: 17/664,164

(22) Filed: May 19, 2022

(65) Prior Publication Data
US 2023/0374391 A1  Nov. 23, 2023

(51) Int. Cl.
- *C10C 3/04* (2006.01)
- *B01F 25/312* (2022.01)
- *B01J 10/00* (2006.01)
- *B01J 19/24* (2006.01)

(52) U.S. Cl.
CPC .............. *C10C 3/04* (2013.01); *B01F 25/312* (2022.01); *B01J 10/005* (2013.01); *B01J 19/2465* (2013.01)

(58) Field of Classification Search
CPC ........ C10C 3/04; B01F 25/312; B01J 10/005; B01J 19/2465
See application file for complete search history.

(56) References Cited

U.S. PATENT DOCUMENTS

| | | | |
|---|---|---|---|
| 1,902,305 A | 3/1933 | Kirschbraun | |
| 9,447,327 B2 | 9/2016 | Aldous | |
| 2012/0132565 A1* | 5/2012 | Aldous | C08L 95/00 208/22 |
| 2013/0319909 A1* | 12/2013 | Moran | C10C 3/04 208/44 |

FOREIGN PATENT DOCUMENTS

| | | | |
|---|---|---|---|
| CA | 3073667 A1 * | 8/2020 | B01J 19/30 |
| RU | 2 000 311 C1 | 9/1993 | |

OTHER PUBLICATIONS

International Search Report and Written Opinion received for PCT Patent Application No. PCT/US2023/022641, dated Jul. 24, 2023, 13 pages.

* cited by examiner

*Primary Examiner* — Randy Boyer
*Assistant Examiner* — Juan C Valencia
(74) *Attorney, Agent, or Firm* — Shook, Hardy & Bacon L.L.P.

(57) ABSTRACT

A process for increasing the softening point of asphalt using an eductor, preheated asphalt is mixed with an input gas in the eductor to form a gas/asphalt mixture. The gas/asphalt mixture is conducted to a heated and pressurized oxidizer vessel via piping connected to the discharge connection of the eductor, where the piping enables a bubble flow pattern to develop therein to enable reaction of the oxygen with the asphalt. The oxygen entrained asphalt mixture is discharged from an exit port of the piping in the oxidizer vessel. The resulting oxidized asphalt product stream has a softening temperature greater than the preheated asphalt feed. The process minimizes the off-gas produced to reduce the carbon footprint.

15 Claims, 8 Drawing Sheets

FIG. 1

(PRIOR ART)

ASPHALT AIR BLOWING WITH LIQUID JET EJECTOR AND COIL

FIELD

The present disclosure relates generally to systems and methods for air blowing of asphalt.

BACKGROUND

Asphalt is one of the world's oldest engineering materials, having been used since the beginning of civilization. Asphalt is a strong, versatile and chemical-resistant binding material that adapts itself to a variety of uses. For example, asphalt can be used to bind crushed stone and gravel into firm tough surfaces for roads, streets, and airport runways. Asphalt can be obtained from either natural deposits or as a by-product of the petroleum industry. Natural asphalts were extensively used until the early 1900s when the discovery of refining asphalt from crude petroleum served to greatly expand the asphalt industry. Modern petroleum asphalt has the same durable qualities as naturally occurring asphalt, with the added advantage of being refined to a uniform condition substantially free of organic and mineral impurities.

Most of the petroleum asphalt produced today is used for road surfacing. Asphalt is also used for expansion joints and patches on concrete roads, as well as for airport runways, tennis courts, playgrounds, and floors in buildings. Another major use of asphalt is in asphalt shingles and roll-roofing (typically comprised of felt saturated with asphalt) where the asphalt helps to preserve and waterproof the roofing material. Other applications for asphalt include, but are not limited to, waterproofing tunnels, bridges, dams and reservoirs, rust-proofing and sound-proofing metal pipes and automotive under-bodies; and sound-proofing walls and ceilings.

The raw material used in modern asphalt manufacturing is petroleum, also known as bitumen, which is a high viscous or semi-solid form of petroleum. Asphalt is a natural constituent of petroleum, and there are crude oils that are almost entirely asphalt. The crude petroleum is separated into its various fractions through a distillation process and, after separation, these fractions are further refined into other products including asphalt, paraffin, gasoline, naphtha, lubricating oil, kerosene and diesel oil. Since asphalt is the heavy constituent of crude petroleum, it does not evaporate or boil off during the distillation process.

If asphalt is to be used for a purpose other than paving (i.e., roofing, pipe coating, or as an under-sealant or waterproofing material), the asphalt may be oxidized, typically by air blowing to produce an asphalt material that softens at a higher temperature than non-oxidized asphalts.

It is generally know that asphalt properties change with temperature. In addition, properties of asphalt can also be modified by passing air through the heated asphalt to raise the softening point of asphalt while maintaining its flexibility at lower temperatures, which is typically accomplished by air blowing. Air blowing modifies the asphalt by an oxidation process that involves the blowing of air through the asphalt at an elevated temperature, typically from 175° C. to 300° C. An exothermic reaction occurs to yield asphalt that has an increased softening point, lower penetration, increased viscosity, and lower rheological temperature susceptibility as compared with the feedstock. Air blowing reactions include oxidation, dehydrogenation, condensation, and polymerization.

During the air blowing process, a certain amount of the oxygen in the air is consumed by the various reactions. Most of the consumed oxygen reacts with hydrogen released in the dehydrogenation, condensation, and polymerization reactions to form water vapor. The resulting off-gas exiting the top of the column is a mixture of the inert nitrogen, unreacted oxygen, water vapor, carbon monoxide, carbon dioxide, hydrogen sulfide, and light hydrocarbons. Furthermore, depending on local regulations, the off-gas may require post treatment, including, for example, one or more of removal of condensates, caustic or water scrubbing, and incineration.

In a conventional air blowing system, the asphalt is typically preheated, after which it is introduced into an oxidizer column just below the normal liquid level. Air is blown through the asphalt by means of an air distributor located at the bottom of the oxidizer column. The air serves not only as the reactant, but also serves to agitate and mix the asphalt, thereby increasing the surface area and rate of reaction. Oxygen is consumed by the asphalt as the air ascends through the material. Steam and/or water may be sprayed into the vapor space above the asphalt level, the former to suppress foaming and dilute the oxygen content of waste gases and the later cools the vapors to prevent after-burning. The "blown" product flows from the bottom of the oxidizer column via an external draw-off line and is pumped through heat exchangers to achieve the desired product temperature and to provide an economical means of preheating the incoming asphalt feed. The penetration and softening point of the blown asphalt are affected by, for example, the viscosity of the feedstock, the temperature in the oxidizer column, the origin of the crude oil used to manufacture the feedstock, the liquid residence time within the oxidizer, and the air to-feed ratio.

The blowing process dehydrogenates the asphalt, resulting in oxidation and polycondensation, increasing the overall molecular size of the asphaltenes already present in the feed and forming additional asphaltenes, including maltenes. Because the reaction is exothermic, close temperature control of the process is required, which is typically achieved by regulating the air to-asphalt ratio in the oxidizer column.

These conventional asphalt air blowing units require an air compressor to introduce air into the bottom of the oxidizer column. The buoyancy of the injected air bubbles serves to gently mix the air/oil and provide some interfacial area. However, the compressor can contribute significantly to the cost of the unit.

Oxidized asphalts are used almost entirely for industrial applications, e.g., roofing, flooring mastics, pipe coatings, paints, etc., and are specified and designated by both softening point and penetration tests, e.g., 85/40 is an oxidized grade asphalt with a softening point of 85° C. plus or minus 5° C. and a penetration of 40 dmm plus or minus 5 dmm.

The aim of the oxidation process is the formation of asphaltenes in which the following phenomena can be identified:

Reactions during which the size of the molecules increases. The formation of esters is particularly important and not only account for at least 60% of the oxygen in oxidized asphalt, but also link two different molecules and thus contribute to the formation of a material having a higher molecular weight. This mechanism results in an increase in the asphaltene content and a change in the colloid-chemical constitution and rheological properties of the asphalt.

Reactions during which the size of the molecule is unchanged. For example, the formation of cyclic hydrocarbons by means of dehydrogenation with H2O as a side product.

Reactions during which the size of the molecule decreases. For example, separation of side branches from molecules with blown distillate produced as a side product.

An improvement to the conventional air blowing process is described, for example, in U.S. Pat. No. 9,447,327 to Aldous, the subject matter of which is herein incorporated by reference in its entirety. This system and process improves the air/oil mixing by using a pump and eductor with a diptube in place of the conventional air compressor/oxidizer column setup.

Figure 1:
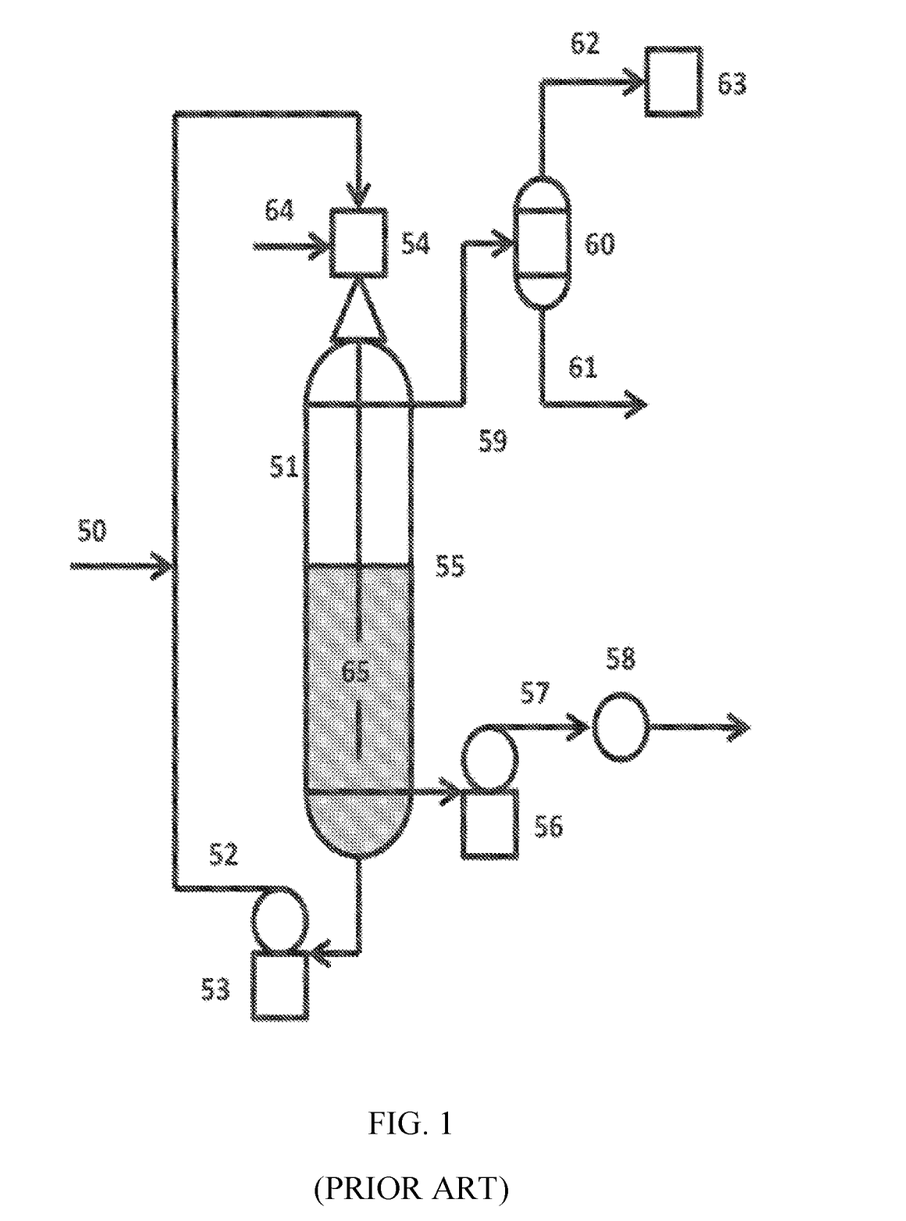
FIG. 1 depicts a process flow scheme of a prior art asphalt oxidation process.

As shown in FIG. 1, an asphalt feed is passed via line 50 and combined with asphalt recycle 52 which exits the bottom of oxidizer vessel 51 and is pumped via pump 53. The combined asphalt feed 50 and asphalt recycle 52 are conducted through a liquid eductor 54 as the motive fluid and entrain atmospheric air 64 into the eductor where it is intimately mixed and reacted with the asphalt feed 50 and asphalt recycle 52. The pressurized air/asphalt mixture from the bottom of the eductor 54 is then conducted via a diptube 65 to the oxidizer vessel 51 and ejected below liquid level 55. The air/asphalt mix is ejected below the surface of the oxidizer vessel liquid level so as to provide more air/asphalt mixing and stripping of light ends from the asphalt product. The system uses a diptube 65 to the liquid eductor outlet and extends it to eject the air/asphalt mix below the oxidizer vessel liquid level. The diptube 65 is sized to maintain a turbulent, dispersed bubble flow pattern through the length of the diptube 65 to provide the mixing/time required to approach the stoichiometric air requirement. With this process, the cumulative air required to produce the same softening point of the asphalt may be at least 10% less, or at least 20% less, or at least 30% less, or at least 40% less, or at least 50% less, or at least 55% less, or at least 60% less, or at least 70% less than the same process without a diptube.

The liquid jet ejector shown in FIG. 1 provides both air compression and mixing for the air and asphalt. This system has been found to be more cost effective and produces a superior result as compared with other conventional systems. However, poor air/oil mixing in the bubble column results in excessive use of air and high carbon dioxide footprint.

One of the difficulties with oxidation of asphalt by air blowing is that conventional oxidation processes are relatively inefficient with regard to oxygen consumption. The amount of oxygen consumed during oxygen is typically 50 mol % or less of the oxygen available in the air used for oxidation resulting in an increase in the cost of air blowing, due to the excess amount of air that requires compression in order to provide oxygen for the process.

Thus, while processes for oxidizing asphalt have been commercial for many years, there remains a need in the art for a more cost effective processes for modifying the physical properties of asphalt by oxidation. In addition, there remains a need in the art for an apparatus that can produce an improved bubble flow pattern which can be maintained for a sufficient amount of time to react more a high percentage of the incoming air. The advantage is a more cost effective system as compared to mechanical mixing within the bubble column.

SUMMARY

The instant disclosure describes a system and method for air blowing of asphalt, which minimizes the offgas produced in the process to reduce the carbon footprint. The system and method allow for air to be entrained more efficiently into the asphalt to enable reaction of the oxygen with the asphalt.

In one embodiment, the present disclosure relates generally to a process for increasing the softening point of asphalt comprising the following steps:

providing an eductor comprising a motive inlet, a motive nozzle, a suction port, a main eductor body, a venturi throat and diffuser, and a discharge connection;

conducting a preheated asphalt feed including fresh asphalt and recycled oxidized asphalt, at a temperature from 150° C. to 300° C., as a motive liquid into the motive inlet of the eductor;

drawing an input gas containing oxygen into the suction port of the eductor;

mixing the preheated asphalt within the main eductor body with the input gas from the suction port of the eductor to form a gas/asphalt mixture;

conducting the gas/asphalt mixture to a heated and pressurized oxidizer vessel via piping connected to the discharge connection of the eductor, wherein the piping enables a bubble flow pattern to develop therein to enable reaction of the oxygen with the asphalt;

ejecting the oxygen entrained asphalt mixture from an exit port of the piping, wherein the exit port of the piping is within the oxidizer vessel;

collecting off-gas from the overhead of the oxidizer vessel and an oxidized asphalt product stream from the bottom of the oxidizer vessel, and recycling a portion of the oxidized asphalt product stream back to the eductor to form the recycled oxidized asphalt;

wherein the oxidized asphalt product stream has a softening temperature greater than the preheated asphalt feed.

A system for increasing the softening point of asphalt is also described.

BRIEF DESCRIPTION OF THE FIGURES

To assist those of ordinary skill in the relevant art in making and using the subject matter hereof, reference is made to the appended drawings, wherein.

DETAILED DESCRIPTION

All numerical values within the detailed description and the claims herein are modified by "about" or "approximately" the indicated value, and take into account experimental error and variations that would be expected by a person having ordinary skill in the art.

As used herein, "a," "an," and "the" refer to both singular and plural referents unless the context clearly dictates otherwise.

As used herein, the terms "about" and "approximately" refer to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform herein. Furthermore, it is also to be understood that the value to which the modifier "about" refers is itself specifically disclosed herein.

When numerical lower limits and numerical upper limits are listed herein, ranges from any lower limit to any upper limit are contemplated.

As used herein, spatially relative terms, such as "beneath", "below", "lower", "above", "upper" and the like, are used for ease of description to describe one element or feature's relationship to another element(s) or feature(s) as illustrated in the figures. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As described herein, the present disclosure provides a system and process for asphalt air blowing that improves air/oil mixing in the oxidizer column to efficiently consumed entrained oxygen and minimize the offgas produced in the system.

Asphalt is pumped through an eductor as the motive fluid to entrain the input gas containing oxygen into the process. The eductor provides a high pressure drop which creates gas bubbles that intimately mix with the oil, thus providing increased interfacial area. As further described herein, piping downstream of the eductor provides the necessary holdup time for the input gas to diffuse into the oil and enable reaction of oxygen with the asphalt.

The present disclosure provides an improved system that efficiently consumes entrained oxygen in the air/gas in the motive fluid and enable reaction of the oxygen with the asphalt. The system consumes at least 80%, or greater than about 85% of the entrained oxygen in the air. In one embodiment, the system consumes greater than about 90% of the entrained oxygen in the air. This minimizes the offgas produced, resulting in a reduced carbon footprint.

As described herein, the present disclosure relates generally to a process for increasing the softening point of asphalt comprising the following steps:

a) providing an eductor comprising a motive inlet, a motive nozzle, a suction port, a main eductor body, a venturi throat and diffuser, and a discharge connection;
b) conducting a preheated asphalt feed including fresh asphalt and recycled oxidized asphalt, at a temperature from 150° C. to 300° C., as a motive liquid into the motive inlet of the eductor;
c) drawing an input gas containing oxygen into the suction port of the eductor;
d) mixing the preheated asphalt within the main eductor body with the input gas from the suction port of the eductor to form a gas/asphalt mixture;
e) conducting the gas/asphalt mixture to a heated and pressurized oxidizer vessel via piping connected to the discharge connection of the eductor, wherein the piping enables a bubble flow pattern to develop therein to enable reaction of the oxygen with the asphalt;
f) ejecting the oxygen entrained asphalt mixture from an exit port of the piping, wherein the exit port of the piping is within the oxidizer vessel;
g) collecting off-gas from the overhead of the oxidizer vessel and an oxidized asphalt product stream from the bottom of the oxidizer vessel, and recycling a portion of the oxidized asphalt product stream back to the eductor to form the recycled oxidized asphalt;

wherein the oxidized asphalt product stream has a softening temperature greater than the preheated asphalt feed.

Figure 2:
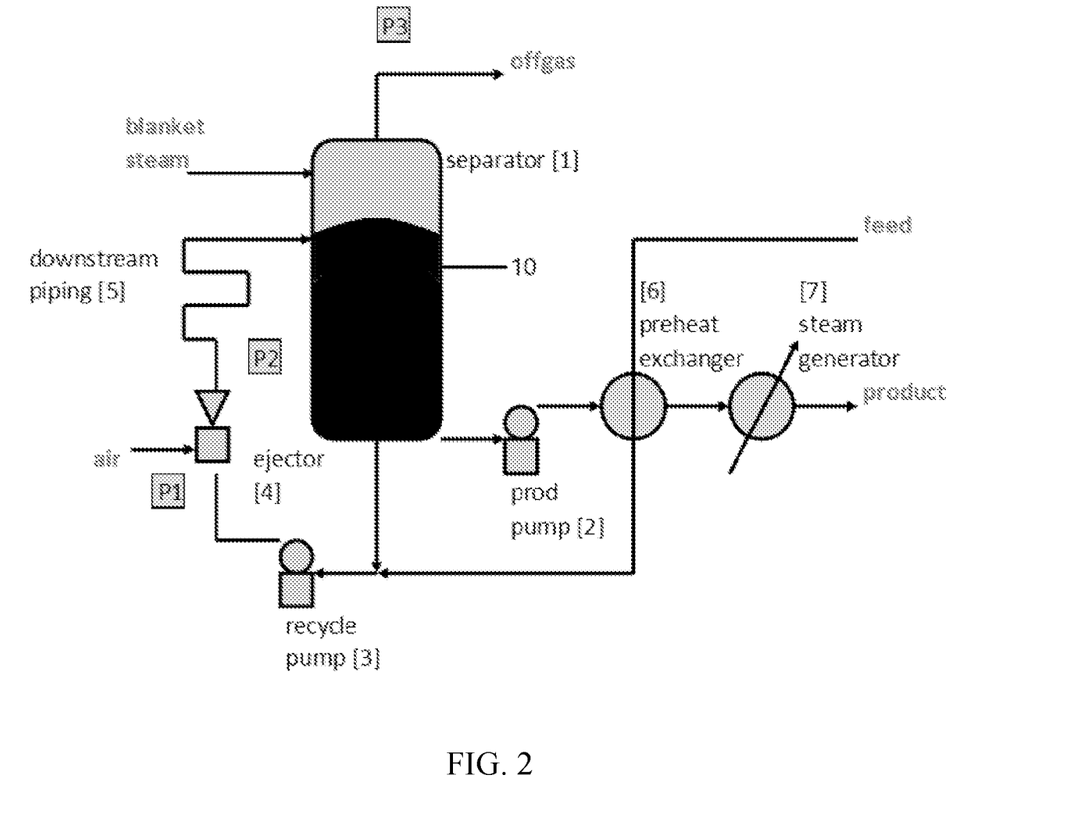
FIG. 2 depicts a process flow scheme of one embodiment of the asphalt oxidation process of the instant disclosure using a liquid eductor.

As shown in FIG. 2, fresh feed is brought into the unit through a preheat exchanger 6 where it is heated to a temperature of about 125 to 300° C. and is then combined with separator 1 recycle to the suction of the recycle pump 3. The recycle pump 3, the liquid eductor 4, and the downstream piping 5 are sized to produce a bubble flow pattern at the outlet of the eductor 4 and maintained in the downstream piping 5 for sufficient time to allow the gas/oil diffusion and reaction of oxygen with the asphalt to occur.

The input gas is not only the reactant, but also services to agitate and mix the asphalt, thereby increasing the surface area and the rate of reaction. Oxygen in the input gas is consumed by the asphalt as the oxygen is reacted with the asphalt. Steam or water can be sprayed (not shown) into the vapor space above the asphalt to suppress foaming. Sufficient pressure is held on the separator 1 to provide an optimum back pressure for the pump/eductor/piping system to optimize the gas entrainment within the downstream piping to allow a bubble flow pattern to develop and be maintained in the downstream piping 5.

Liquid asphalt feed is introduced into the asphalt air blowing system through the suction of the recycle pump. A recycle stream is required to provide a large enough motive flow to entrain the required air for the fresh feed. In one embodiment, the recycled asphalt feed rate is at least 1 times greater than that of the fresh asphalt feed rate and may be at least 5 times greater or at least 10 times greater than that of the fresh asphalt feed rate. By "required air" what is meant is at least a stoichiometric amount, but not so much that it will cause undesirable results from either a reaction or process pint of view. The stoichiometric amount of air will be determined by the amount of oxidizable components in the particular asphalt feed. In one embodiment, it is preferred that a stoichiometric amount of air be used.

The recycle/feed motive flow ratio is ~80:1. Air is entrained into the eductor and intimately mixed with the motive fluid. The eductor outlet pressure is maintained at ~30 psig by the pressure balance in the downstream piping and separator. The separator pressure can be adjusted to move the eductor outlet pressure but is expected to be set at about 5 psig to allow flow through a condenser, scrubber and into an incinerator.

The eductor outlet conditions are set to initiate a bubble flow pattern in the downstream piping 5 which in turn is sized to provide adequate residence time for the oxygen to diffuse into the asphalt and complete the reaction. The eductor outlet gas/liquid stream then enters a separator to disengage the gas from the liquid.

A certain amount of residence time provided by the downstream piping is required to diffuse the input gas into the asphalt and allow the reaction of the oxygen contained within the input gas and the asphalt to go to completion. In addition, the flow pattern in the downstream piping is critical to the performance of the asphalt blowing reaction and bubble flow needed to be achieved through the downstream piping. In addition, in order to achieve the optimal result, the downstream piping 5 should monotonously increase in elevation from the discharge connection of the eductor to the exit port of the piping. In one embodiment, the piping 5 does not contain any downward portions between the discharge connection of the eductor 4 and the exit port of the piping 5 as the bubble flow pattern will potentially be destroyed. The overall length, diameter, and arrangement of the downstream piping may be optimized to achieve the desired bubble flow pattern and can be determined by the processes described herein.

The liquid eductor 4 requires a minimum pressure drop in order to entrain the input gas into the motive fluid to enable reaction of the oxygen contained within the input gas with the asphalt. A bubble flow pattern provides increased interfacial area for mass transfer to occur. Pressure decreases bubble size for increased interfacial area for mass transfer to occur; mass transfer is a combination of interfacial area and diffusion. In addition, sufficient time is required for diffusion to occur in a given system for mass transfer to occur.

In one embodiment, the exit port of the downstream piping 5 is positioned at a level below the liquid level in the oxidizer vessel 10 and may be positioned at least 1 inch below the liquid level of the oxidizer vessel 10 in order to minimize spraying.

Liquid is drawn off near the bottom of the oxidizer vessel 10, where a portion of the liquid is recycled to provide sufficient motive flow to entrain the required air.

The remaining product is pumped through a medium pressure steam generator to cool the product before going to offsite product tankage.

The offgas leaving the separator may be first passed through a condenser to remove condensable (water and hydrocarbon) before being caustic scrubbed for removal of sulfur. The treated gas is finally incinerated for removal of VOCs before release to the atmosphere. By use of the process and system described herein, the production of offgas is reduced, resulting in a reduced carbon footprint.

Eductors have a specific operating range in which they will entrain air as set by the motive flow and the eductor outlet pressure as determined by the system pressure drop. Air entrainment increases with increasing motive pressure but decreases with increasing eductor outlet pressure. The expected range of motive fluid viscosity at conditions is 10-50 cSt based on viscosity temperature calculations of a number of different asphalts.

The operating temperature range of the system may be within a range of about 200-270° C. Higher temperatures lower the viscosity of the motive fluid at conditions and improve the air/oil diffusion resulting in improved air utilization and higher unit capacity and it may be possible to run at temperature as high as 270° C. without a degradation in product quality.

On the other hand, while the reaction proceeds more quickly at higher temperatures, the bubble flow created by the downstream piping 5 allows the system to proceed at a lower temperature. This is important because from a standpoint of quality, air blowing at a lower temperature will yield a better product. The inventors of the present disclosure have found that it is possible to maintain a temperature as low as 220° C. and it may even be possible to maintain a temperature as low as 200° C. This is a significant improvement over the prior art The pressure of the mixture exiting the liquid jet ejector will be in excess of the pressure at which the oxidizer is operated and will be further adjusted to allow for the resulting off gas from the oxidizer to be introduced into the fuel gas system of the refinery. In addition, it is preferred that the temperature within the separator will be at least 10° C. higher, or at least 20° C., or at least 30° C. higher than the incoming asphalt feed temperature.

The residence time is the holdup time of the input gas/asphalt mixture in the downstream piping.

Flow regime in the downstream piping of the eductor is a key factor for air utilization and the ultimate capacity of the unit.

Bubble flow provides the best flow regime for the diffusion limited reactions to occur. Correlations were developed using the cold flow measured interfacial area and the calculated Spedding factors (X and Y) (see the Examples below).

The extent of reaction is measured by the oxygen content in the offgas. The lower the amount of unreacted oxygen, the higher the extent of reaction. While most conventional bubble column air blowers will have 10 vol. % oxygen in the offgas, the system described herein is expected to achieve less than 5 vol. %; possibly 1% or less. Asphalt air blowing is not kinetically limited, rather it is mass transfer limited. The generation of interfacial area alone is not enough to cause the reaction to go to completion, which was demonstrated by the lack of complete reaction within the eductor of the pilot unit.

The oxidizer vessel 10 is typically operated at low pressures of 0 to 10 barg, more preferably 0 to 5 barg, more preferably 0 to 2 barg. The low pressure off-gas, which is primarily comprised of nitrogen and water vapor, is often conducted to an incinerator where it is burned before being discharged to the atmosphere. The oxidized asphalt product stream is then conducted via line and pumped via pump through a heat exchanger where it is used to preheat the asphalt feed being conducted to oxidizer vessel 10. The hot asphalt product stream is then conducted via line to steam generator where it is cooled prior to going to storage. Steam or water can be sprayed (not shown) into the vapor space above the asphalt to suppress foaming and to dilute the oxygen content of waste gases that are removed via line and conducted to a knockout drum to remove any condensed or entrained liquids via line.

An asphalt feed is passed via line and combined with asphalt recycle which exits the bottom of oxidizer vessel 10 and is pumped via pump. The combined asphalt feed and asphalt recycle are conducted through liquid eductor 4 as the motive fluid and entrain atmospheric air into the eductor 4 where it is intimately mixed and reacted with the asphalt feed and asphalt recycle.

Any suitable liquid eductor can be used in the practice of the present disclosure. Liquid eductors are typically comprised of a motive inlet, a motive nozzle, a suction port, a main body, a venturi throat and diffuser, and a discharge connection, wherein the hot asphalt, typically at a temperature from 125° C. to 300° C., is conducted as the motive liquid into said motive inlet and wherein the input gas stream is drawn into the suction port and mixed with the asphalt within the eductor body.

The input gas drawn into the suction port of the liquid eductor may be air (i.e., containing approximately 21% oxygen) or may contain various amounts of oxygen up to substantially 100% oxygen. In addition, the input gas can be either at atmospheric pressure or may be compressed.

As described herein, the present disclosure also relates generally to a system for increasing the softening point of asphalt comprising:
- a heated and pressurized oxidizer vessel 10;
- an eductor 4, the eductor comprising a motive inlet, a motive nozzle, a suction port, a main eductor body, a venturi throat and diffuser, and a discharge connection, wherein preheated feed including fresh asphalt and recycled oxidized asphalt, at a temperature from 150° C. to 300° C., as a motive liquid is introduced into the motive inlet of the eductor and an input gas comprising oxygen is introduced into the suction port of the eductor, wherein the preheated asphalt within the main eductor body is mixed with the input gas from the suction port of the eductor to form a gas/asphalt mixture;
- downstream piping 5 situated between the discharge connection of the eductor 4 and the heated and pressurized oxidizer vessel 10, wherein the piping 5 has an exit port within the pressurized oxidizer vessel 10, wherein the piping 5 conducts the gas/asphalt mixture to the pressurized oxidizer vessel 10, and wherein the piping 5 enables a bubble flow pattern to develop therein to enable reaction of the oxygen with the asphalt;
- means for collecting off-gas from an overhead of the oxidizer vessel 10;
- means for collecting an oxidized asphalt product stream from the bottom of the oxidizer vessel, and
- means for recycling a portion of the oxidized asphalt product stream back to the eductor to form the recycled oxidized asphalt; and
- wherein the system consumes at least 90% of entrained oxygen to minimize production of off-gas.

In one embodiment, the means for collecting off-gas from the overhead of the oxidizer vessel 10 may include a line for conducting the off-gas to a condenser to remove condensable water and hydrocarbon before it is further treated to remove sulfur and VOCs.

In one embodiment and as shown in FIG. 2, the means for collecting the oxidized asphalt stream from the bottom of the oxidizer vessel may include a line at the bottom of the oxidizer vessel that draws the oxidized asphalt stream out of the oxidizer vessel and through a product pump 2, where the oxidized asphalt stream may be pumped to a tank for storage. In one embodiment, as the oxidized asphalt is piped to the storage tank, it is used as a heat exchanger 6 to preheat the incoming asphalt feed. In one embodiment, the oxidized asphalt stream is pumped through a steam generator 7 to cool the product prior to storage.

In one embodiment, the means for recycling a portion of the product stream back to the conductor comprises a line to draw the portion of the product stream out of the bottom of the oxidizer vessel where it can be mixed with the incoming asphalt feed and then the combined recycle stream/incoming product stream may be pumped through a recycle pump 3 to the eductor 4.

The following are examples of the present disclosure and are not to be construed as limiting.

EXAMPLES

A batch pilot process was constructed to test the feasibility of the use of the liquid eductor and piping to entrain the necessary air and mix the air/oil sufficiently for the asphalt oxidation reaction to occur.

The pilot unit was built around a Jacoby-Tarbox ½ inch MLB eductor operating at 1.5-2.5 gpm. There are four basic challenges in scaling the pilot unit to commercial size:
- The eductor must scale
- The eductor must entrain sufficient air for reaction
- A bubble flow pattern must be established at the eductor outlet
- The bubble flow pattern must be maintained for sufficient time for reaction of air Eductors have a specific operating range in which they will entrain air as set by the motive flow and the eductor outlet pressure as determined by the system pressure drop. Cold flow studies were performed on the Jacoby-Tarbox 1½ inch MLE eductor to determine the operating window.

Cold flow hydrodynamic experiments were conducted to map the interactions of motive fluid viscosity and flow, air entrainment, and back pressure (defined as pressure at the liquid jet ejector outlet) on fluid flow patterns and interfacial area produced for the ½-inch Jacoby-Tarbox MLB liquid eductor system, similar to that employed in the asphalt air blower pilot unit. Motive fluid viscosities (10-50 cP) similar to those in the pilot unit were simulated by temperature adjustment of a water-glycol mixture.

Figure 3:
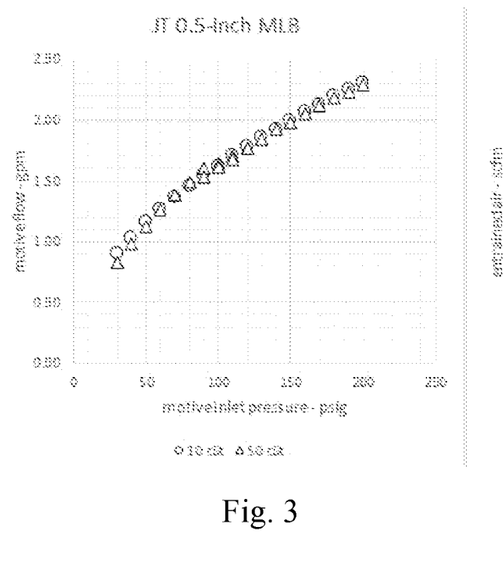
FIG. 3 depicts a graph that demonstrates eductor motive flow as a function of motive pressure.
Figure 4:
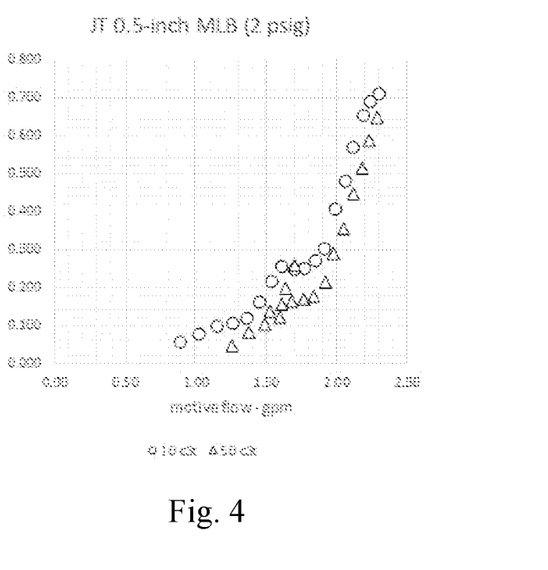
FIG. 4 depicts a graph that demonstrates air entrainment for a given motive fluid and back pressure.

The motive flow is a function of the motive pressure irrespective of motive fluid viscosity as shown in FIG. 3. However, motive fluid viscosity impacts the air entrainment for a given motive flow and back pressure as shown in FIG. 4. As shown in FIG. 4, air entrainment increases with increasing motive flow and decreases with increasing back pressure.

Figure 5:
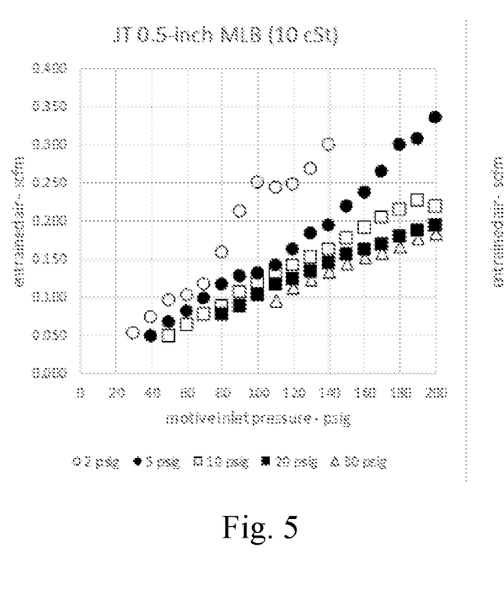
FIGS. 5 and 6 depict the impact of motive fluid viscosity/pressure and back pressure on air entrainment for eductors with motive fluid viscosities of 10 cSt and 50 cSt.
Figure 6:
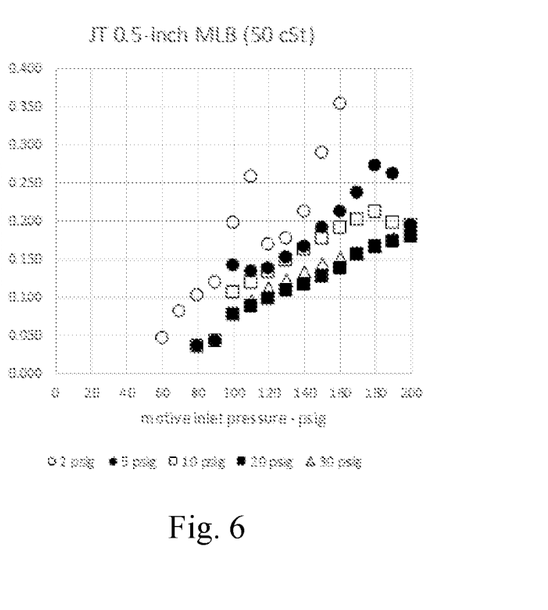

The impact of motive fluid viscosity/pressure and back pressure on air entrainment is shown in FIGS. 5 and 6. As back pressure and/or motive fluid viscosity increases, air entrainment deceases.

Figure 7:
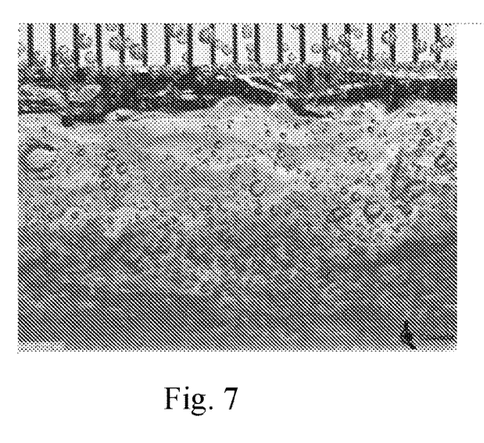
FIGS. 7 and 8 depict photographs that show the different of the flow patterns and interfacial areas produced in a pipe with varying levels of back pressure
Figure 8:
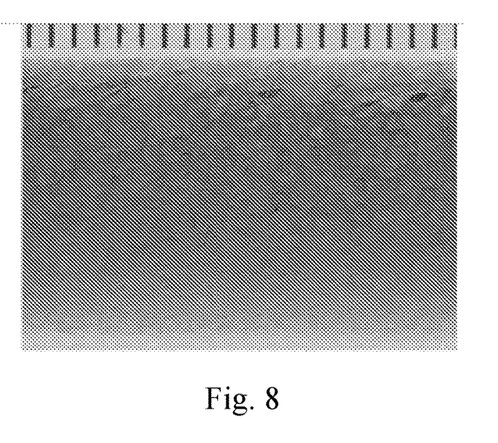

High speed videography was used to record the cold flow testing and assess the flow patterns and interfacial areas produced and evaluate the application of back pressure. Kinematic viscosity (10 cSt) and motive pressure (200 psig) were held constant and the amount of back pressure was varied between 2 psig back pressure (FIG. 7) and 20 psig back pressure (FIG. 8). As shown in FIGS. 7 and 8, the application of a higher back pressure improves the flow pattern and increases the interfacial area.

Figure 9:
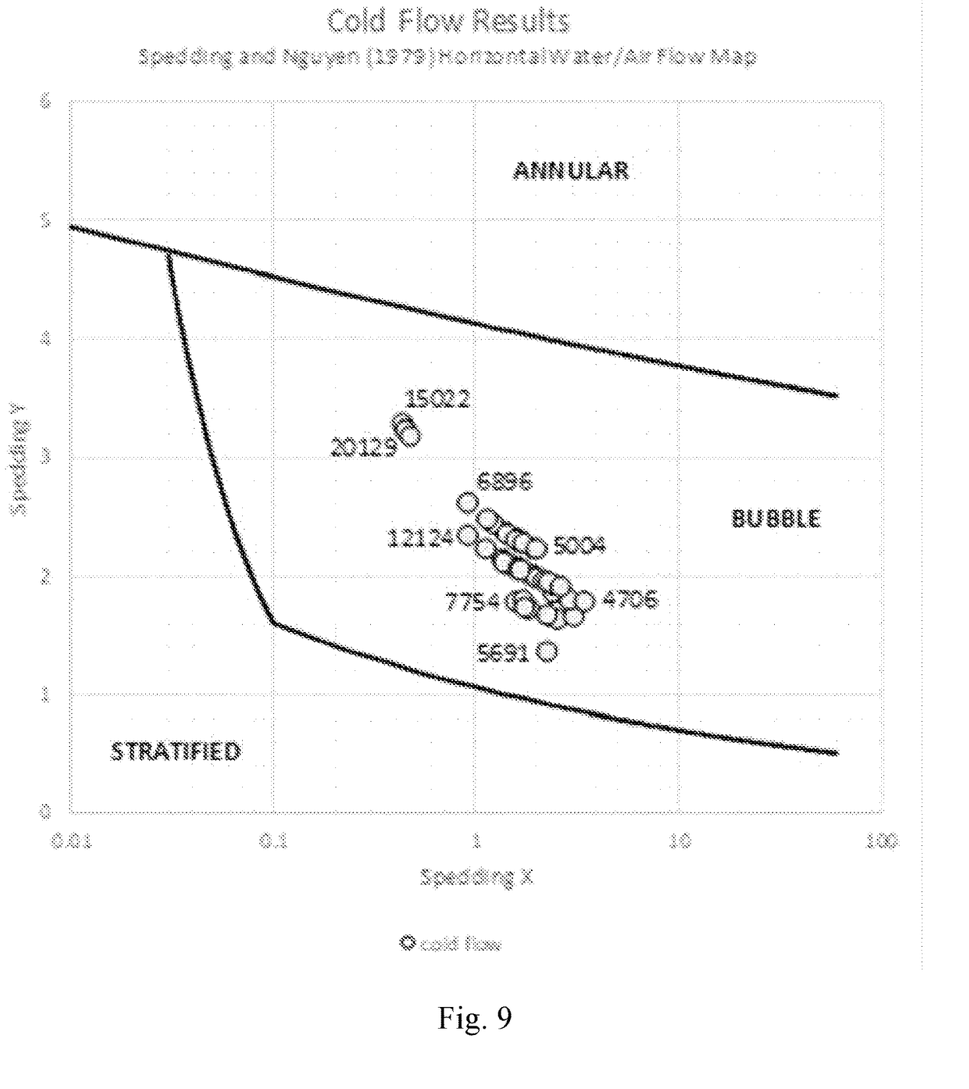
FIG. 9 depicts a Spedding and Nguyen horizontal water/air flow map for cold flow testing results.

Cold Flow Test Results:

Cold flow testing results were plotted on a portion of Spedding and Nguyen's (1979) horizontal air/water flow pattern map and the results are shown in FIG. 9.

Spedding and Nguyen developed a two dimensional map of two-phase flow patterns in pipe. The two dimensions they chose to describe the map are:
- Spedding $X = Q_L/Q_G$ and
- Spedding Y=Froude Number ^0.5

$Q_L$ and $Q_G$ are the volumetric flowrates of the liquid and gas, respectively.

The Froude number is a dimensionless parameter that measures the ratio of the inertia force on an element of fluid to the weight of the fluid element, i.e., the inertial force divided by the gravitational force. The Froude number is relevant in fluid dynamics where the weight (gravitational force) of the fluid is an important force. The Froude number can be expressed as:

$$Fr = v/(g \cdot h_m)^{1/2}$$

where:
Fr=Froude number
v=viscosity (m/s)
g=acceleration of gravity 99.81 m/s$^2$)
hm=hydraulic mean depth or characteristic length (m)

Regions of stratified, bubble, and annular flow are described on the Spedding and Nguyen map developed from lab experiments on air/water. Although the air/asphalt system at conditions is different than the air/water system at ambient conditions, the patterns are believed to be similar, although adjusted when compared to the air/asphalt system.

Although all points are within the bubble flow region, the interfacial area produced varies significantly with the Spedding X versus Y relationship. Generally, interfacial area increases with increasing Spedding Y and decreasing Spedding X; pushing toward the upper left corner of the flow map.

As seen in FIG. 9, the bubble flow region is in the center of the map. The upper area of the map (labeled "ANNULAR") indicates annular flow, meaning that the fluid flow would be pushed towards the walls of the pipe. The lower area of the map (labeled "STRATIFIED") indicates stratified flow, meaning that the flow is layered. As can be seen from FIG. 9, it is desirable that all of the points be within the bubble flow area of the map to achieve optimal interfacial area to enable reaction of oxygen with the asphalt within the tubing.

Figure 10:
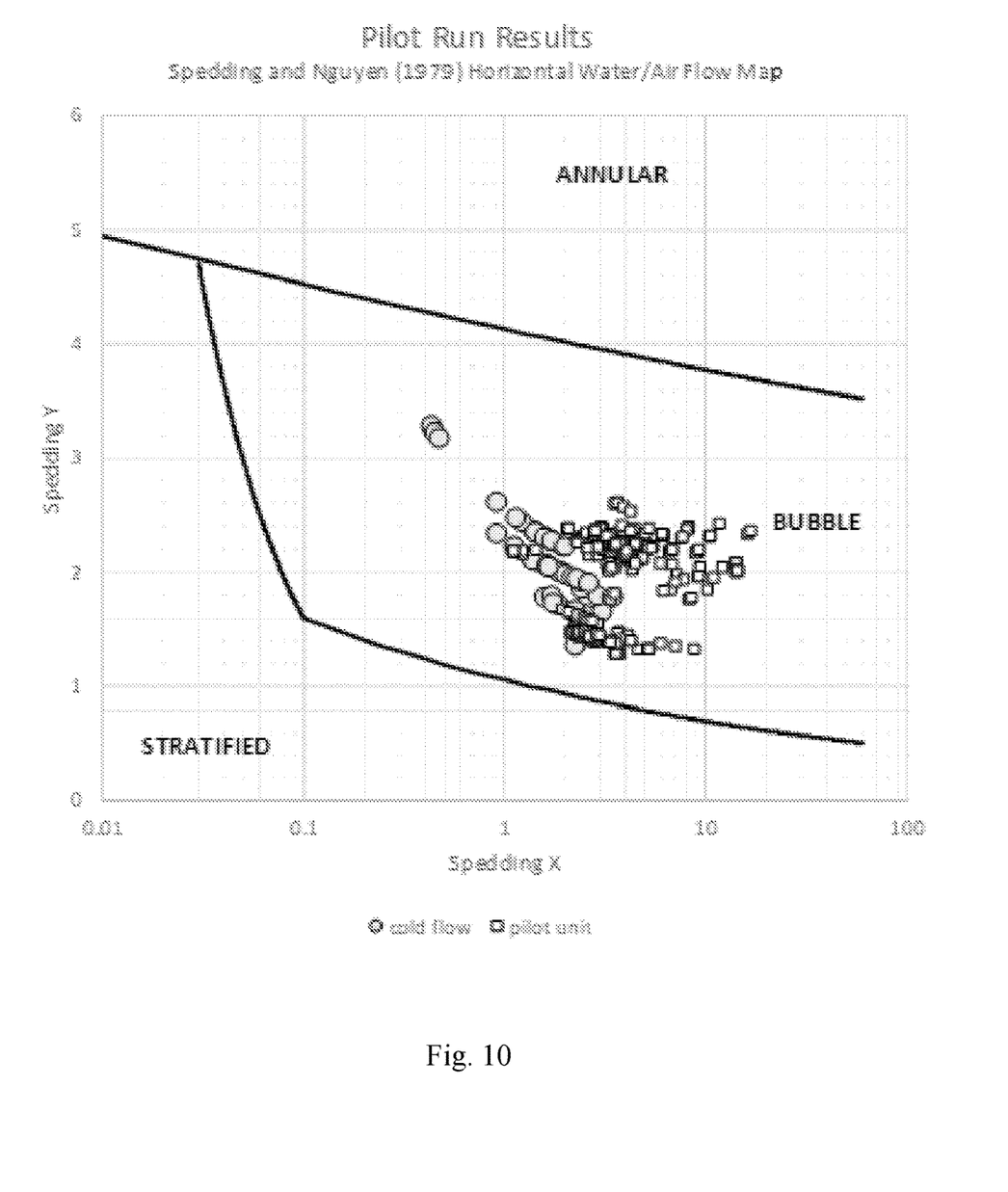
FIG. 10 depicts a Spedding and Nguyen horizontal water/air flow map for a comparison of the cold flow results with those obtained in the asphalt air blower pilot unit

FIG. 10 is a comparison of the cold flow results with those obtained in the asphalt air blower pilot unit. As shown in FIG. 10, all of the pilot unit points desirably are well within the bubble flow area of the map.

With pilot unit results in the bubble flow regime, the next issue to be resolved is asphalt air blowing efficiency as measured by the offgas oxygen content. The lower the offgas oxygen content, the greater the asphalt air blowing efficiency and approach to stoichiometric oxygen requirement. Higher air blowing efficiency means lower air requirement, lower offgas, and reduced carbon footprint.

Figure 11:
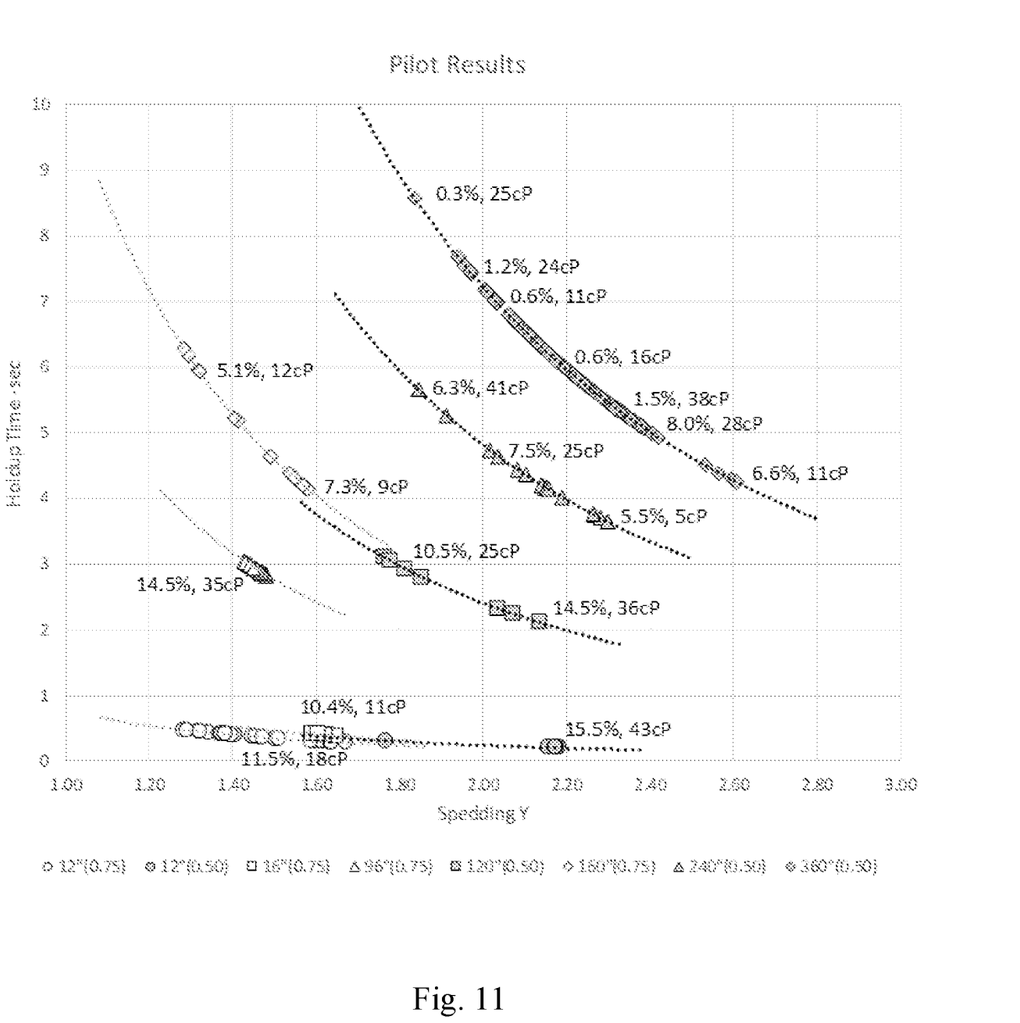
FIG. 11 depicts a plot of the pilot unit Spedding Y as plotted against the holdup time.

Referencing the Spedding and Nguyen flow maps in FIGS. 9 and 10, the pilot unit Spedding Y was plotted against the holdup time in FIG. 11 to determine the best regime to allow for 90+% consumption of the entrained oxygen. Each curve represents a tube length in inches and a nominal tube diameter in inches. A number of points along the different curves are noted with the measured offgas oxygen content and the asphalt viscosity at the pilot unit temperature.

As seen in FIG. 11, decreasing Spedding Y and asphalt viscosity in the pilot unit results in lower offgas oxygen content for a given tube length and diameter. Also, as seen in FIG. 11, the longer tube lengths for a given diameter result in longer holdup times which also result in lower offgas oxygen contents.

Figure 12:
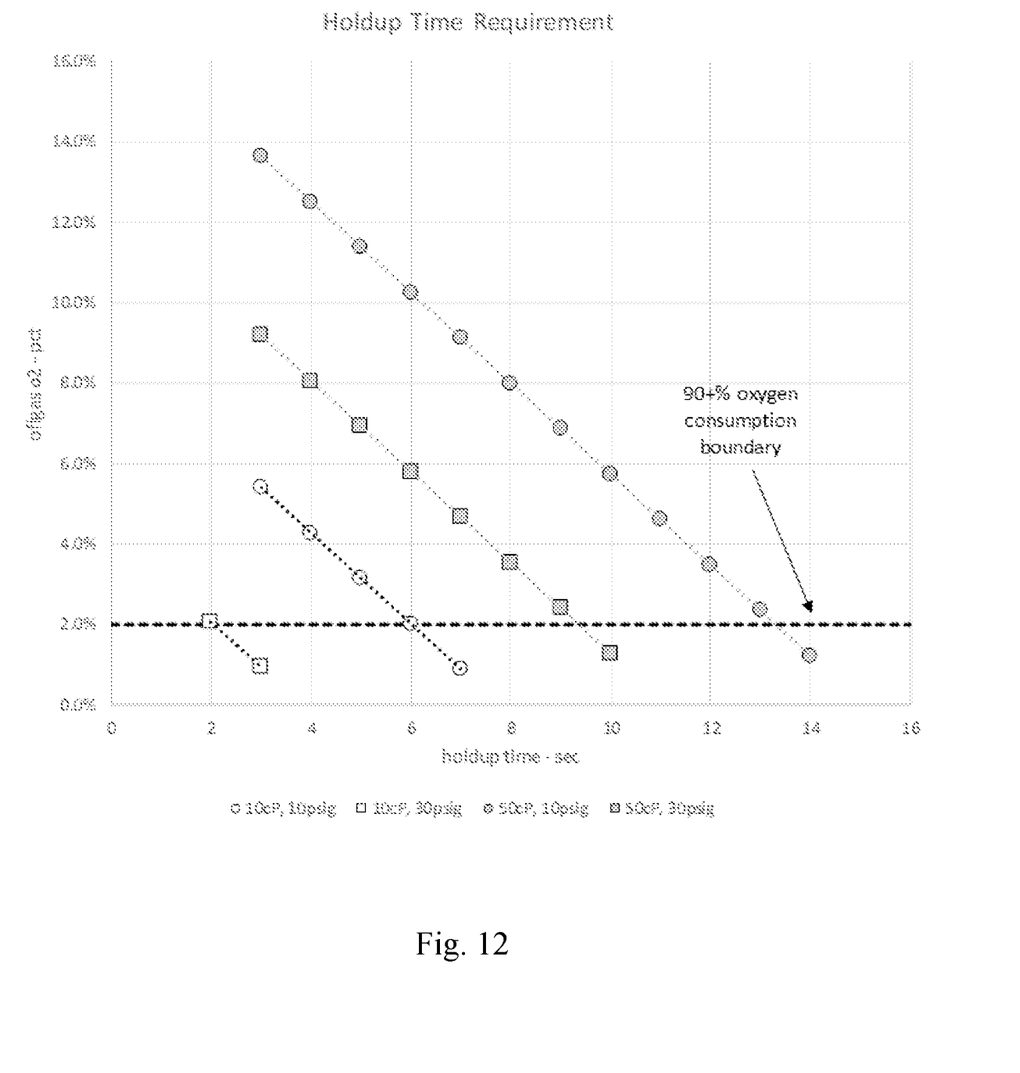
FIG. 12 depicts a regression of the pilot run data to develop a model to determine the holdup time requirement for a given system back pressure and asphalt viscosity at conditions.

The pilot run data was then regressed to develop a model to determine the holdup time requirement for a given system back pressure and asphalt viscosity at operating conditions. A certain amount of residence time provided by the downstream piping 5 is required to diffuse the air into the oil and allow the reaction to go to completion. A plot of the Froude number (Spedding Y) versus residence time in the pilot plant eductor's downstream tubing shows the impact on the offgas oxygen content or extent of reaction. The longer the residence time, the lower the offgas oxygen content and the higher the extent of reaction. 5+ seconds appears to be the minimum residence time to achieve less than 1 vol. % oxygen in the offgas at temperatures approaching 250° C.

A correlation was developed from the data as follows:

Offgas O$_2$ vol %=0.473634−0.00418441*Spedding X−0.0171437*Spedding Y−0.00666491*residence time (sec)−0.00143629*° C.

The correlation is shown graphically below in FIG. 12.

As can be seen, the liquid eductor pilot process performed as well as or better than the conventional counterpart. It should be noted that the conventional pilot unit could not achieve the low offgas oxygen content at similar conditions as the liquid jet eductor process signifying the improved efficiency of the liquid jet ejector air blower versus the conventional air blower.

The instant disclosure is suitable for increasing the softening temperature of any type of asphalt, both naturally occurring and asphalts that result from the distillation of crude oil. Although it is typically desired to increase the softening temperature of asphalt for uses other than paving, it may be desirable to also increase the softening temperature for asphalts for some paving applications.

PCT/EP Clauses:

Clause 1. A process for increasing the softening point of asphalt comprising the following steps: providing an eductor comprising a motive inlet, a motive nozzle, a suction port, a main eductor body, a venturi throat and diffuser, and a discharge connection; conducting a preheated asphalt feed including fresh asphalt and recycled oxidized asphalt, at a temperature from 150° C. to 300° C., as a motive liquid into the motive inlet of the eductor; drawing an input gas containing oxygen into the suction port of the eductor; mixing the preheated asphalt within the main eductor body with the input gas from the suction port of the eductor to form a gas/asphalt mixture; conducting the gas/asphalt mixture to a heated and pressurized oxidizer vessel via piping connected to the discharge connection of the eductor, wherein the piping enables a bubble flow pattern to develop therein to enable reaction of the oxygen with the asphalt; ejecting the oxygen entrained asphalt mixture from an exit port of the piping, wherein the exit port of the piping is within the oxidizer vessel; and collecting off-gas from the overhead of the oxidizer vessel and an oxidized asphalt product stream from the bottom of the oxidizer vessel, and recycling a portion of the oxidized asphalt product stream back to the eductor to form the recycled oxidized asphalt; and wherein the oxidized asphalt product stream has a softening temperature greater than the preheated asphalt feed.

Clause 2. The process of clause 1, wherein the exit port of the piping is positioned below the liquid level in the oxidizing vessel.

Clause 3. The process of clause 2, wherein the exit port of the piping is positioned at least 1 inch below the liquid level in the oxidizer vessel.

Clause 4. The process of clauses 1-3, wherein the piping is situated to increase monotonously in elevation from the discharge connection of the eductor to the exit port of the piping.

Clause 5. The process of clause 4, wherein the piping does not contain any downward portions between the discharge connection of the eductor and the exit port of the piping.

Clause 6. The process of clauses 1-5, wherein the residence time of the gas/asphalt mixture in the piping is sufficient to react at least 90% of the oxygen.

Clause 7. The process of clauses 1-6, wherein the oxidizer vessel is operated at a temperature from 150° C. to 300° C. with the proviso that it be at least 10° C. greater than the temperature of the preheated asphalt feed being conducted to said motive inlet of the eductor.

Clause 8. The process of clauses 1-7, wherein the input gas containing oxygen contains at least 20% oxygen.

Clause 9. The process of clauses 1-8, wherein the input gas is at least substantially 100% oxygen.

Clause 10. The process of clauses 1-9, wherein the input gas is compressed.

Clause 11. The process of clauses 1-10, wherein the recycled oxidized asphalt feed rate is at least 1 times greater than that of the fresh asphalt feed rate.

Clause 12. The process of clauses 1-11, wherein the oxidizer vessel is operated at a pressure of from 0 to 10 barg.

Clause 13. The process of clauses 1-12, further including the step of injecting steam from a steam generator to the oxidizer vessel, wherein the injecting steam to the oxidizer vessel is above or below the liquid mixture in the oxidizer vessel.

Clause 14. Oxidized asphalt produced by the process of clauses 1-13.

Clause 15. A system for increasing the softening point of asphalt comprising: a heated and pressurized oxidizer vessel; an eductor, the eductor comprising a motive inlet, a motive nozzle, a suction port, a main eductor body, a venturi throat and diffuser, and a discharge connection, wherein preheated feed including fresh asphalt and recycled oxidized asphalt, at a temperature from 150° C. to 300° C., as a motive liquid is introduced into the motive inlet of the eductor and an input gas comprising oxygen is introduced into the suction port of the eductor, wherein the preheated asphalt within the main eductor body is mixed with the input gas from the suction port of the eductor to form a gas/asphalt mixture; piping situated between the discharge connection of the eductor and the heated and pressurized oxidizer vessel, wherein the piping has an exit port within the pressurized oxidizer vessel, wherein the piping conducts the gas/asphalt mixture to the pressurized oxidizer vessel, and wherein the piping enables a bubble flow pattern to develop therein to enable reaction of the oxygen with the asphalt; means for collecting off-gas from an overhead of the oxidizer vessel; means for collecting an oxidized asphalt product stream from the bottom of the oxidizer vessel, and means for recycling a portion of the oxidized asphalt product stream back to the eductor to form the recycled oxidized asphalt; and wherein the system consumes at least 90% of entrained oxygen to minimize production of off-gas.

Clause 16. The system of clause 15, wherein the piping is situated to increase monotonously in elevation from the discharge connection of the eductor to the exit port of the piping.

Clause 17. The system of clauses 16-17, wherein the piping does not contain any downward portions between the discharge connection of the eductor and the exit port of the piping.

Applicants have attempted to disclose all embodiments and applications of the disclosed subject matter that could be reasonably foreseen. However, there may be unforeseeable, insubstantial modifications that remain as equivalents.

While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this disclosure and for all jurisdictions in which such incorporation is permitted.

What is claimed is:

1. A process for increasing the softening point of asphalt comprising the following steps:
   providing an eductor comprising a motive inlet, a motive nozzle, a suction port, a main eductor body, a venturi throat and diffuser, and a discharge connection;
   conducting a preheated asphalt feed including fresh asphalt and recycled oxidized asphalt, at a temperature from 150° C. to 300° C., as a motive liquid into the motive inlet of the eductor;
   drawing an input gas containing oxygen into the suction port of the eductor;
   mixing the preheated asphalt within the main eductor body with the input gas from the suction port of the eductor to form a gas/asphalt mixture;
   conducting the gas/asphalt mixture to a heated and pressurized oxidizer vessel via piping connected to the discharge connection of the eductor, wherein the piping enables a bubble flow pattern to develop therein to enable reaction of the oxygen with the asphalt, the conducting comprising conducting the gas/asphalt mixture via the piping for a residence time of at least 5 seconds;
   ejecting the oxygen entrained asphalt mixture from an exit port of the piping, wherein the exit port of the piping is within the oxidizer vessel; and
   collecting off-gas from the overhead of the oxidizer vessel and an oxidized asphalt product stream from the bottom of the oxidizer vessel, and recycling a portion of the oxidized asphalt product stream back to the eductor to form the recycled oxidized asphalt; and
   wherein the oxidized asphalt product stream has a softening temperature greater than the preheated asphalt feed.

2. The process of claim 1, wherein the exit port of the piping is positioned below the liquid level in the oxidizing vessel.

3. The process of claim 2, wherein the exit port of the piping is positioned at least 1 inch below the liquid level in the oxidizer vessel.

4. The process of claim 1, wherein the piping is situated to increase monotonously in elevation from the discharge connection of the eductor to the exit port of the piping.

5. The process of claim 4, wherein the piping does not contain any downward portions between the discharge connection of the eductor and the exit port of the piping.

6. The process of claim 1, wherein the residence time of the gas/asphalt mixture in the piping is sufficient to react at least 90% of the oxygen.

7. The process of claim 1, wherein the oxidizer vessel is operated at a temperature from 150° C. to 300° C. with the proviso that it be at least 10° C. greater than the temperature of the preheated asphalt feed being conducted to said motive inlet of the eductor.

8. The process of claim 7, wherein the oxidizer vessel is operated at a temperature from 200° C. to 270° C.

9. The process of claim 1, wherein the input gas containing oxygen contains at least 20% oxygen.

10. The process of claim 9, wherein the input gas is at least substantially 100% oxygen.

11. The process of claim 9, wherein the input gas is compressed.

12. The process of claim 1, wherein the recycled oxidized asphalt feed rate is at least 1 times greater than that of the fresh asphalt feed rate.

13. The process of claim 12, wherein the recycled oxidized asphalt feed rate is at least 5 times greater than that of the fresh asphalt feed rate.

14. The process of claim 1, wherein the oxidizer vessel is operated at a pressure of from 0 to 10 Barg.

15. The process of claim 1, further including the step of injecting steam from a steam generator to the oxidizer vessel, wherein the injecting steam to the oxidizer vessel is above or below the liquid mixture in the oxidizer vessel.

* * * * *